United States Patent
Love et al.

(10) Patent No.: US 7,313,486 B2
(45) Date of Patent: Dec. 25, 2007

(54) APPARATUS AND METHOD FOR DETECTING A CORROSIVE SUBSTANCE LEAK IN A CHEMICAL COMPOSITION ANALYZER

(75) Inventors: John Stanley Love, Houston, TX (US); Vipin Malik, Cypress, TX (US)

(73) Assignee: Daniel Industries, Inc., Houston, TX (US)

( * ) Notice: Subject to any disclaimer, the term of this patent is extended or adjusted under 35 U.S.C. 154(b) by 0 days.

(21) Appl. No.: 11/351,804

(22) Filed: Feb. 10, 2006

(65) Prior Publication Data

US 2007/0192042 A1    Aug. 16, 2007

(51) Int. Cl.
G06F 19/00 (2006.01)
G01B 5/28 (2006.01)

(52) U.S. Cl. .......... 702/35; 73/25.03; 73/706; 340/605

(58) Field of Classification Search .......... 702/22, 702/30, 35, 51, 53, 58, 170; 73/25.03, 706; 340/605; 374/141; 324/551, 694
See application file for complete search history.

(56) References Cited

U.S. PATENT DOCUMENTS 4,631,952 A * 12/1986 Donaghey ............ 73/25.03

2005/0162280 A1 * 7/2005 Hayashida et al. ......... 340/605
2006/0101920 A1 * 5/2006 Carnal et al. ............... 73/706

* cited by examiner

*Primary Examiner*—John Barlow
*Assistant Examiner*—John Le
(74) *Attorney, Agent, or Firm*—Conley Rose, P.C.

(57) ABSTRACT

An apparatus includes a detection element having a detection element property that changes when exposed to a corrosive substance, a testing device coupled to the detection element, the testing device configrued to measure the detection element property, and a processor in communication with the testing device, the processor configured to indicate the presence of the corrosive substance using the detection element property. In an embodiment, the detection element is metal and the detection element property is resistivity. In another embodiment, the apparatus further includes a comparison element coupled to the testing device and shielded from the corrosive substance, the comparison element having a comparison element property, and wherein the processor is configured to compare the detection element property to the comparison element property to determine whether the detection element property is within a predetermined range of the comparison element property. A method of detecting the corrosive substance is also disclosed.

20 Claims, 2 Drawing Sheets

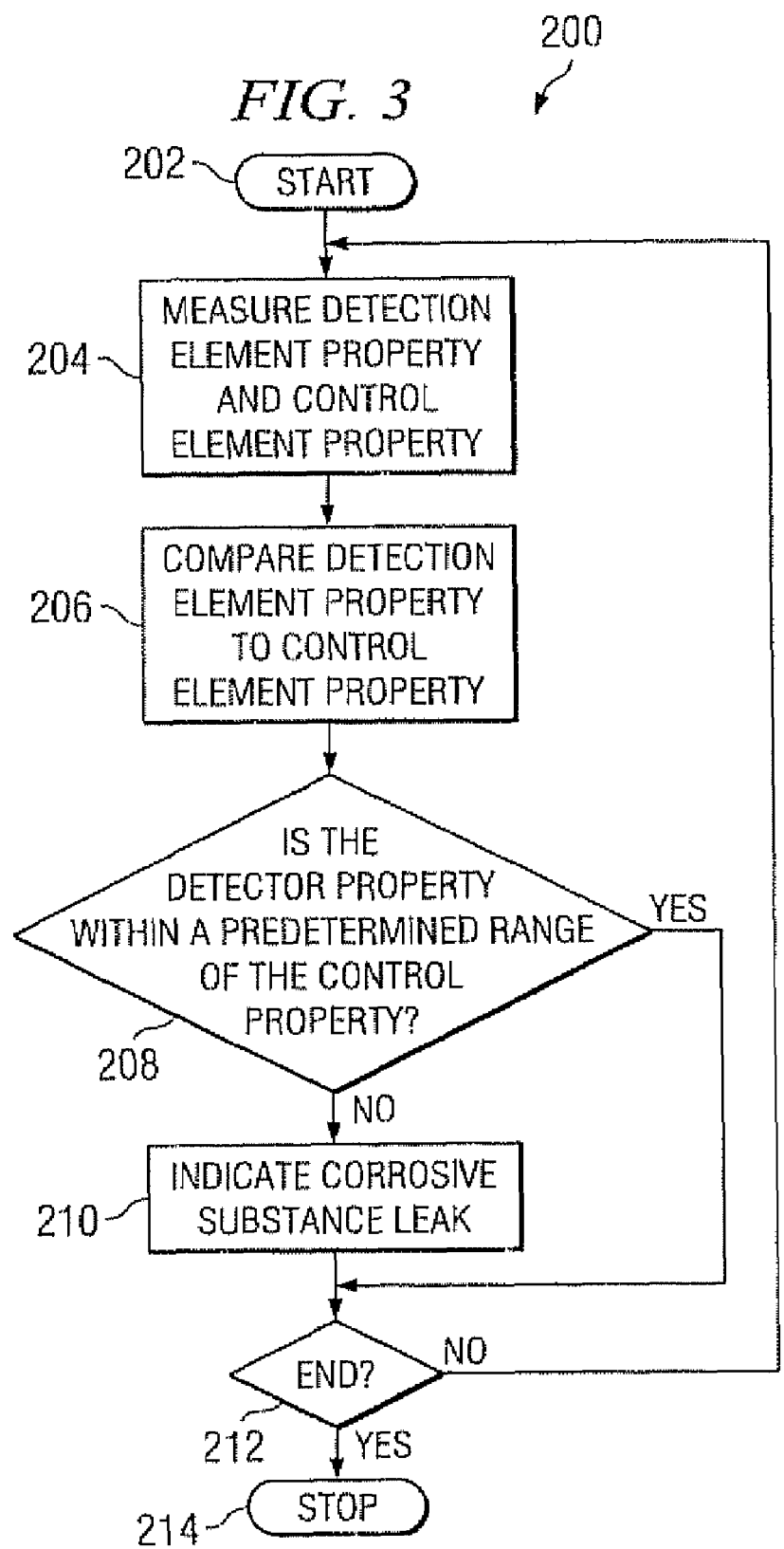

APPARATUS AND METHOD FOR DETECTING A CORROSIVE SUBSTANCE LEAK IN A CHEMICAL COMPOSITION ANALYZER

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A chemical composition analyzer is a device that analyzes a material to determine the composition of the material. One common type of chemical composition analyzer is a gas chromatograph, which comprises a chromatography tube and a chromatograph detector. The chromatography tube is a long, thin tube that is typically coiled within the gas chromatograph. An inert gas carries a sample of the material along the chromatography tube, where the sample breaks up into different molecules. The molecules have different molecular weights and pass through the chromatography tube at various rates, such that the lighter molecules exit the chromatography tube before the heavier molecules. As the molecules exit the chromatography tube, they are analyzed by the chromatograph detector to determine the abundance and molecular weight of each type of molecule. The chromatograph detector, known to one skilled in the art, is connected to a data output device, such as a monitor, printer or computer, that displays the results of the sample analysis. The results of the sample analysis are generally in the form of a chromatogram, which is a chart that has time on the X-axis, the abundance (typically measured in millivolts) on the Y-axis, and a variable-height line with one or more peaks graphed on the two axes. Scientists and engineers can determine the chemical composition of the sample based on the data in the chromatogram. Alternatively, the gas chromatograph can be configured to automatically determine the chemical composition of the sample based on the data in the chromatogram.

Oftentimes, chemical composition analyzers, such as a gas chromatograph, are used to determine the composition of corrosive substances. The corrosive substances are generally kept within the internal plumbing of the gas chromatograph, such as the chromatography tube, chromatograph detector, and various valves and tubes. However, the corrosive substance will occasionally leak from the internal plumbing and corrode the internal components of the gas chromatograph, such as the circuits and control mechanisms. Although it may take days or even weeks for the corrosive substance to permanently damage the internal components of the gas chromatograph, when a corrosive substance leak occurs, it is rarely detected before the internal components are damaged. Corrosive substance leaks are rarely detected before the internal components are damaged because the gas chromatograph is examined or serviced infrequently, such as when one of the internal components fails or requires maintenance. The infrequency of service is due to the complex nature of the gas chromatograph and the necessity of maintaining an air-tight housing for some gas chromatographs. If there were a device that detected the corrosive substance leak, particularly during operation of the gas chromatograph, then the leak could be repaired and the corrosive substance removed from the chemical composition analyzer such that failure of the internal components could be avoided. Consequently, a need exists for an apparatus for detecting a corrosive substance leak in a chemical composition analyzer, particularly while the chemical composition analyzer is fully operational.

BRIEF DESCRIPTION OF THE DRAWINGS

For a more complete understanding of the present invention, and for further details and advantages thereof, reference is now made to the accompanying drawings, in which:

FIG. 3 is a flow sheet of the logic used by one embodiment of detector evaluation program of the present invention.

DETAILED DESCRIPTION

Figure 1:
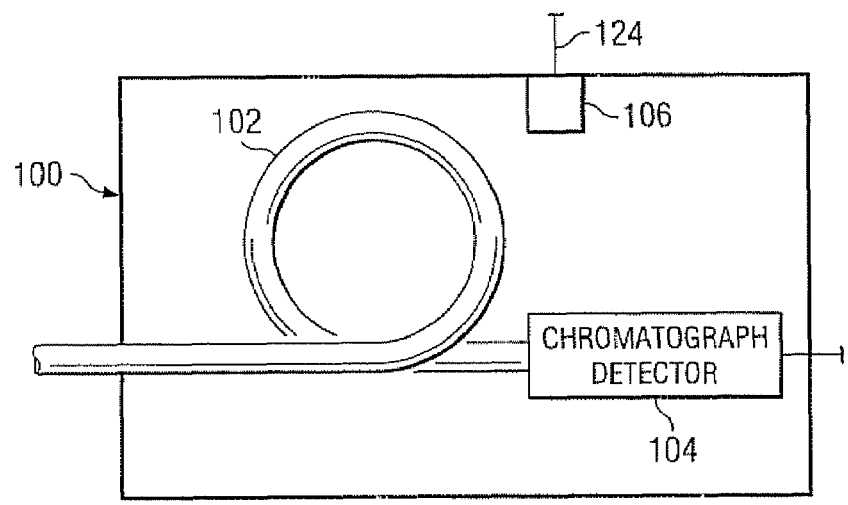
FIG. 1 is a block diagram of one embodiment of a chemical composition analyzer of the present invention.

FIG. 1 is a block diagram of one embodiment of a chemical composition analyzer, specifically a gas chromatograph, incorporating the invention. As with a traditional gas chromatograph, the gas chromatograph 100 of the present invention comprises a chromatography tube 102 and a chromatograph detector 104. However, the gas chromatograph 100 shown in FIG. 1 has been modified to include the present invention, which includes a detector 106. The detector 106 detects the presence of a corrosive substance (not shown) in the interior of the gas chromatograph 100 and uses a data output line 124 to indicate the presence of the corrosive substance so that remedial action can be taken. Of course, persons of ordinary skill in the art will appreciate that the present invention includes chemical composition analyzers other than those specifically described herein and that the present invention should not be limited to the chemical composition analyzers described herein.

Figure 2A:
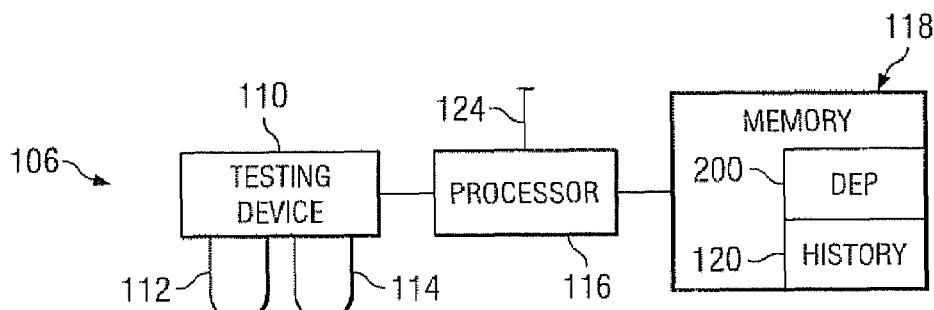
FIG. 2A is a schematic section view of one embodiment of the detector of the present invention.

FIG. 2A is a schematic section view of one embodiment of the detector 106 of the present invention. The detector 106 shown in FIG. 2A comprises a testing device 110, a detection element 112, a comparison or control element 114, a processor 116, the data output line 124, and a memory 118. The memory 118 comprises a detector evaluation program 200 and optionally a history 120. As explained in further detail below, the detection element 112 has a detection element property that can be measured by the testing device 110. The detection element property changes when the detection element 112 is exposed to the corrosive substance (not shown). Similarly, the control element 114 has a control element property that can also be measured by the testing device 110. However, the control element property does not change when the control element 114 is exposed to the corrosive substance. As explained in further detail below, the detector 106 shown in FIG. 2A uses the differences between the detection element property and the comparison element property to determine whether the corrosive substance exists in the gas chromatograph 100.

Figure 2B:
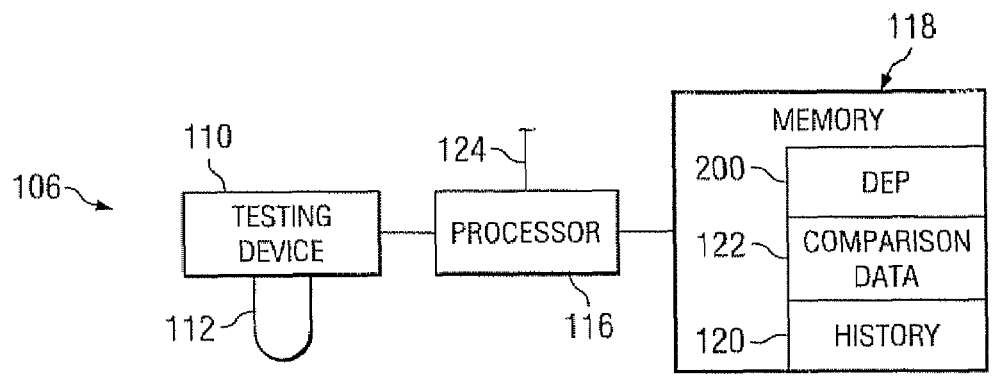
FIG. 2B is a schematic section view of an alternative embodiment of the detector of the present invention.

FIG. 2B is a schematic section view of an alternative embodiment of the detector 106 of the present invention. Similar to the embodiment of the detector 106 shown in FIG. 2A, the detector 106 shown in FIG. 2B comprises the testing device 110, detection element 112, processor 116, data output line 124, and memory 118 comprising the detector evaluation program 200 and optionally the history 120. However, unlike the embodiment shown in FIG. 2A, the embodiment shown in FIG. 2B contains a comparison data 122 and does not contain the comparison element. Thus, the detector 106 shown in FIG. 2B does not use the difference between the detection element property and the comparison element property to determine whether a corrosive substance exists within the gas chromatograph 100. Instead, as explained in further detail below, the embodiment of the detector 106 shown in FIG. 2B compares the detection element property to the comparison data 122 to determine whether a corrosive substance exists in the gas chromatograph 100. Of course, persons of ordinary skill in the art will appreciate that the present invention includes detectors other than those specifically described herein and that the present invention should not be limited to the detectors described herein.

The detection element 112 detects the presence of the corrosive substance in the gas chromatograph 100. The detection element 112 is exposed to the interior of the gas chromatograph 100 such that the detection element 112 reacts with the corrosive substance if the corrosive substance exists within the interior of the gas chromatograph 100. Preferably, the corrosive substance reacts with the detection element 112 prior to and/or at a faster rate than the other internal components of the gas chromatograph 100, such as the chromatography tube 102, chromatograph detector 104, circuits (not shown), controllers (not shown), and the other elements of the detector 106. In an embodiment, the detection element 112 may be made of a highly reactive metal material, such as copper or aluminum. In another embodiment, the detection element 112 may be made of a material that changes color when it reacts with the corrosive substance, such as litmus paper or other types of chemical indicators. Further in the alternative, the detection element 112 may be made of a material that changes optical properties when it reacts with the corrosive substance, such as a fiber optic. Of course, persons of ordinary skill in the art will appreciate that the present invention includes detection elements other than those specifically described herein and that the present invention should not be limited to the detection elements described herein.

The detection element 112 has a detection element property that changes when the detection element 112 reacts with the corrosive substance. The detection element property may be a physical property, such as mass, volume, density, temperature, color, tensile strength, or any other physical property. Alternatively, the detection element property may be an electrical property, such as resistivity, impedance, capacitance, or any other electrical property. If the detection element property is an electrical property, it may be an alternating current (AC) electrical property or a direct current (DC) electrical property. Further in the alternative, the detection element property may be an optical property, such as luminance, optical clarity, percent transmission, reflectivity, refractive index, or any other optical properties. Preferably, the detection element 112 is metal and the detection element property is resistivity. However, persons of ordinary skill in the art will appreciate that the present invention includes detection element properties other than those specifically described herein and that the present invention should not be limited to the detection element properties described herein.

The comparison element 114 comprises a material that does not react with the corrosive substance but is similar to the detection element 112. In an embodiment, the comparison element 114 may be identical to the detection element 112, with the exception that the comparison element 114 is shielded from the corrosive substance. The shielding may be a protective coating applied to the exterior of the comparison element 114, such as paint, epoxy, or polymers. Alternatively, a shielding apparatus may separate the comparison element 114 from the remainder of the interior of the gas chromatograph 100 such that the comparison element 114 does not come into contact with the corrosive substance when the corrosive substance is present in the interior of the gas chromatograph 100. Of course, persons of ordinary skill in the art will appreciate that the present invention includes comparison elements other than those specifically described herein and that the present invention should not be limited to the comparison elements described herein.

The comparison element 114 has a comparison element property that does not substantially change when the comparison element 114 is exposed to the corrosive substance. As explained above, the comparison element 114 may be shielded from the corrosive substance by a coating or shielding apparatus. However, even though the comparison element property is not substantially affected by the corrosive substance, the comparison element property may not be necessarily constant. Rather, the comparison element property may change as a result of variations in any of the environmental conditions within the gas chromatograph 100, such as temperature, pressure, humidity, air composition, luminance, or other environmental conditions. In the preferred embodiment where the detection element 112 and the comparison element 114 are constructed of substantially identical materials, the detection element property and the comparison element property may be substantially identically affected by any changes in the environmental conditions within the gas chromatograph 100. For example, if the temperature within the gas chromatograph 100 increases and changes the resistivity of a metal detection element 112, the temperature increase also changes the resistivity of a metal comparison element 114 substantially the same amount as the change in resistivity of the metal detection element 112. Consequently, the comparison element property may be used to account for changes in the detection element property due to factors other than the presence of the corrosive substance. Of course, persons of ordinary skill in the art will appreciate that the present invention includes comparison elements other than those specifically described herein and that the present invention should not be limited to the comparison elements described herein.

The testing device 110 is an apparatus that measures the detection element property and the comparison element property. As explained below, the processor 116 uses the testing device 110 to measure the detection element property and the comparison element property so that the processor 116 may compare the detection element property to the comparison element property and determine whether a corrosive substance exists within the gas chromatograph 100. In an embodiment of the invention in which the detection element property and the comparison element property may be the mass of the detection element 112 and the comparison element 114, respectively, the testing device 110 may be a device that measures the mass of the detection element 112 and the comparison element 114, such as a scale. In the embodiment of the invention in which the detection element 112 and the comparison element 114 are metal and the detection element property and the comparison element property are resistivity, the testing device 110 may be an apparatus that measures resistivity, such as a galvanometer, ammeter, or voltmeter. Alternatively, in the embodiment of the invention in which the detection element 112 and the comparison element 114 are made of a material that changes color when it reacts with the corrosive substance, the testing device 110 may be an apparatus that measures the color of the detection element 112 and the comparison element 114. Further in the alternative, in the embodiment of the invention in which the detection element 112 and the comparison element 114 are made of a material that changes optical properties when it reacts with the corrosive substance, the testing device 110 may be an apparatus that measures the optical properties of the detection element 112 and the comparison element 114. In embodiments of the invention in which there is no comparison element 114, the testing device may measure the detection element property and optionally the environmental conditions within the gas chromatograph 100. Of course, persons of ordinary skill in the art will appreciate that the present invention includes testing devices other than those specifically described herein and that the present invention should not be limited to the testing devices described herein.

In the embodiment shown in FIG. 2B, the detector 106 comprises the comparison data 122 in lieu of the comparison element 114. The comparison data 122 may be a compilation of data regarding the detection element 112, specifically the detector evaluation program 200. In one embodiment, the comparison data 122 may be a single value, such as the resistivity of the detection element 112. Such an embodiment of the comparison data 122 is advantageous when the storage space in memory 118 is limited. In alternative embodiments, the comparison data 122 comprises different values for different sets of environmental conditions within the gas chromatograph 100. For example, the comparison data 122 may comprise the resistivity of detection element 112 for numerous combinations of environmental conditions within the gas chromatograph 100. Such an embodiment is beneficial because it accounts for changes in the detection element property due to changes in the environmental conditions within the gas chromatograph 100 while removing the need for the comparison element 114. Of course, persons of ordinary skill in the art will appreciate that the present invention includes comparison data other than those specifically described herein and that the present invention should not be limited to the comparison data described herein.

In an alternative embodiment, the memory 118 further comprises the history 120. The history 120 may be a record of the detection element property over time. If the detector 106 contains a comparison element 114, the history 120 may optionally comprise the comparison element property over time. The value of the detection element property and optional comparison element property may be stored on a continual basis, or may be stored on an incremental basis, such as every second, minute, hour, day, week, or an integral value of any of the aforementioned time increments, such as 2, 3, or 5 second intervals. Of course, persons of ordinary skill in the art will appreciate that the present invention includes history other than those specifically described herein and that the present invention should not be limited to the history described herein.

Referring to FIGS. 2A and 2B, the processor 116 and memory 118 will now be described in greater detail. The processor 116 may be any logic performing circuitry that can interface with the memory 118 and a data output device (not shown) via the data output 124. The memory 118 may be any type of storage media suitable for storing the comparison data 122, the history 120, and the detector evaluation program 200 described herein. The data output 124 allows the processor 116 to upload or download data from the memory 118 to an external device (not shown), such as a computer. The data that the processor 116 can upload or download includes the comparison data 122, the history 120, the detector evaluation program 200, or any other data stored in the memory 118. Persons of ordinary skill in the art are aware of several types of processors 116 and memory 118 that are suitable for the invention described herein.

The processor 116 and memory 118 may be stand alone components or may be integrated with the testing device 110. In one embodiment, the processor 116 and memory 118 are stand alone components that may be individually added to or removed from the gas chromatograph 100. In another embodiment, the processor 116 and memory 118 may be integrated with the processor and memory (not shown) used by the testing device 110 or the chromatograph detector 104. Integrating the processor 116, the memory 118, and the testing device 110 together is advantageous because it allows the present invention to be easily added to existing gas chromatographs. When the processor 116, the memory 118, and the testing device 110 are integrated together, they contain the data output 124 such as a plug that can be connected to the other circuitry within the gas chromatograph 100 or to a data output device (not shown). Of course, persons of ordinary skill in the art will appreciate that the present invention includes processors and memory other than those specifically described herein and that the present invention should not be limited to the processors and memory described herein.

Another piece of data that may be stored in the memory 118 is the detector evaluation program 200. The detector evaluation program 200 is a program executed by the processor 116 that compares the detection element property to the comparison element property to determine whether a corrosive substance leak exists within the interior of the gas chromatograph 100. FIG. 3 is an example of a flow sheet of the logic of the detector evaluation program 200. The detector evaluation program 200 starts at 202 when the gas chromatograph 100 is operating. At 204, the detector evaluation program 200 instructs the testing device 110 to measure the detection element property and the comparison element property. The detection element property and the comparison element property may be stored in the memory 118 for permanent storage as history 120, but may also be stored in memory 118 temporarily until the detection element property is compared to the comparison element property by the detector evaluation program 200.

In the alternative embodiment of the invention illustrated in FIG. 2B, the detector evaluation program 200 does not instruct the testing device 100 to measure the comparison element property because no comparison element exists. Instead, the detector evaluation program 200 accesses the comparison data 122 in the memory 118 and uses the comparison data 122 in lieu of the comparison element property for the processing steps described herein.

At 206, the detector evaluation program 200 compares the detection element property to the comparison element property to determine the extent to which the detection element property deviates from the comparison element property. Minor deviations of the detection element property from the comparison element property do not necessarily indicate the presence of the corrosive substance leak. Persons of ordinary skill in the art will appreciate that the detection element property may vary from the comparison element property when a corrosive substance is not present within the gas chromatograph 100 because the comparison element 114 differs from the detection element 112 in that the comparison element 114 is coated or otherwise shielded from the corrosive substance. Thus, the detector evaluation program 200 is configured to compare the detection element property to the comparison element property and determine whether the detection element property falls outside of a predetermined range of deviation from the comparison element property. Persons of ordinary skill in the art know how to configure the predetermined range of deviation between the detection element property and the comparison element property. However, for the purposes of explanation and not to be construed in a limiting sense, the predetermined range may be any one of a 1, 2, 5, 10, 20, or 50 percent deviation from the comparison element property.

At 208, the detector evaluation program 200 then determines whether the detection element property is within the predetermined range of the comparison element property. If the detector evaluation program 200 determines that the detection element property is within the predetermined range of the comparison element property, then the detector evaluation program 200 proceeds to 212. If the detector evaluation program 200 determines that the detection element property is not within the predetermined range of the comparison element property, then the detector evaluation program 200 proceeds to 210.

At 210, the detector evaluation program 200 indicates the presence of the corrosive substance leak. The detector evaluation program 200 may indicate the presence of the corrosive substance leak by sending a signal to a data output device (not shown) via the data output 124 (shown in FIGS. 2A and 2B). Examples of data output devices that may be used to indicate the presence of the corrosive substance leak are lights, buzzers, klaxons, monitors, printers, diagnostic programs, telecommunication devices, and other output devices not specifically listed herein. Of course, persons of ordinary skill in the art will appreciate that the aforementioned list of data output devices is not exclusive and that the present invention should not be limited to the data output devices described herein. Once the detector evaluation program 200 has indicated the presence of the corrosive substance leak, the detector evaluation program 200 proceeds to 212 where the detector evaluation program 200 determines whether the detector evaluation program 200 should end. The detector evaluation program 200 should end when the gas chromatograph 100 (shown in FIG. 1) is shut down or otherwise in a sleeping or non-active state. If the detector evaluation program 200 determines that the detector evaluation program 200 should not end, then detector evaluation program 200 returns to 204. If the detector evaluation program 200 determines that the detector evaluation program 200 should end, the detector evaluation program 200 ends at 214.

Although the present invention is described in conjunction with a gas chromatograph, persons of ordinary skill in the art will appreciate that the present invention may be implemented on other types of chemical composition analyzers. More specifically, the present invention is useful for any type of testing apparatus in which detecting the presence of a corrosive substance within the interior of the testing apparatus is an important feature of the apparatus. Persons of ordinary skill in the art will appreciate that the present invention may be used in a variety of other applications.

While a number of preferred embodiments of the invention have been shown and described herein, modifications thereof may be made by one skilled in the art without departing from the spirit and the teachings of the invention. The embodiments described herein are exemplary only and are not intended to be limiting. Many variations, combinations, and modifications of the invention disclosed herein are possible and are within the scope of the invention. Accordingly, the scope of protection is not limited by the description set out above, but is defined by the claims which follow, that scope including all equivalents of the subject matter of the claims.

The invention claimed is:

1. An apparatus for detecting a corrosive substance, the apparatus comprising:
    a detection element having a detection element property that changes when exposed to a corrosive substance;
    a testing device coupled to the detection element, the testing device configured to measure the detection element property;
    a processor in communication with the testing device, the processor configured to indicate the presence of the corrosive substance using the detection element property;
    a comparison element coupled to the testing device and having a comparison element property; and
    a shielding disposed adjacent the comparison element;
    wherein the testing device is configured to measure the comparison element property; and
    wherein the processor is configured to compare the detection element property to the comparison element property to determine whether the detection element property is within a predetermined range of the comparison element property, and indicate the presence of the corrosive substance in response to the determination that the detection element property is not within the predetermined range of the comparison element property.

2. The apparatus of claim 1 wherein the detection element is metal and the detection element property is an electrical property.

3. The apparatus of claim 2 wherein the detection element is at least one of copper and aluminum.

4. The apparatus of claim 2 wherein the detection element property is at least one of resistivity, impedance, and capacitance.

5. The apparatus of claim 1 wherein the detection element is paper and the detection element property is the color of the detection element.

6. A chemical composition analyzer comprising the apparatus of claim 1.

7. The apparatus of claim 6 further comprising:
    a tube carrying the corrosive substance within the interior of the tube;
    wherein the detection element is exposed to the exterior of the tube; and
    wherein the processor is further configured to indicate that the tube is defective when the detection element property changes in response to exposure to the corrosive substance.

8. The apparatus of claim 7 wherein the detection element is metal and the detection element property is an electrical property.

9. The apparatus of claim 7 wherein the detection element is paper and the detection element property is the color of the detection element.

10. An apparatus for detecting a corrosive substance, the apparatus comprising:
a detection element having a detection element property that changes when exposed to a corrosive substance;
a testing device coupled to the detection element, the testing device configured to measure the detection element property;
a processor in communication with the testing device, the processor configured to indicate the presence of the corrosive substance using the detection element property; and
a memory comprising a comparison data;
wherein the processor is configured to compare the detection element property to the comparison data to determine whether the detection element property is within a predetermined range of the comparison data, and indicate the presence of the corrosive substance in response to the determination that the detection element property is not within the predetermined range of the comparison data.

11. The apparatus of claim 10 wherein the detection element is metal and the detection element property is an electrical property.

12. The apparatus of claim 11 wherein the detection element is at least one of copper and aluminum.

13. The apparatus of claim 11 wherein the detection element property is at least one of resistivity, impedance, and capacitance.

14. The apparatus of claim 10 wherein the detection element is paper and the detection element property is the color of the detection element.

15. A chemical composition analyzer comprising the apparatus of claim 10.

16. The apparatus of claim 15 further comprising:
a tube carrying the corrosive substance within the interior of the tube;
wherein the detection element is exposed to the exterior of the tube; and
wherein the processor is further configured to indicate that the tube is defective when the detection element property changes in response to exposure to the corrosive substance.

17. A chemical composition analyzer comprising:
a tube carrying a corrosive substance within the interior of the tube;
a detection element exposed to the exterior of the tube, the detection element being metal and having a detection element resistivity that changes when exposed to the corrosive substance;
a comparison element coupled to the testing device, the comparison element being metal and having a comparison element resistivity;
a shielding disposed adjacent the comparison element;
a testing device coupled to the detection element and the comparison element, the testing device configured to measure the detection element resistivity and the comparison element resistivity; and
a processor in communication with the testing device, the processor configured to compare the detection element resistivity to the comparison element resistivity to determine whether the detection element resistivity is within a predetermined range of the comparison element resistivity, and indicate that the tube is defective in response to the determination that the detection element resistivity is not within the predetermined range of the comparison element resistivity.

18. The chemical composition analyzer of claim 17 wherein the detection element and the comparison element are at least one of copper and aluminum.

19. A method of detecting a corrosive substance in a chemical composition analyzer, the method comprising:
disposing a detection element within the chemical composition analyzer;
disposing a comparison element within the chemical composition analyzer;
shielding the comparison element;
operating the chemical composition analyzer;
measuring a comparison element property;
measuring a detection element property while operating the chemical composition analyzer;
comparing the detection element property to the comparison element property;
determining whether the detection element property is within a predetermined range of the comparison element property ;and
indicating the presence of the corrosive substance in response to the determination that the detection element property is not within the predetermined range of the comparison element property.

20. A method of detecting a corrosive substance in a chemical composition analyzer, the method comprising:
disposing a detection element within the chemical composition analyzer;
storing a comparison data in a memory;
operating the chemical composition analyzer:
measuring a detection element property while operating the chemical composition analyzer;
comparing the detection element property to the comparison data;
determining whether the detection element property is within a predetermined range of the comparison data; and
indicating the presence of the corrosive substance in response to the determination that the detection element property is not within the predetermined range of the comparison data.

* * * * *